United States Patent
Illsley et al.

(10) Patent No.: US 11,339,303 B2
(45) Date of Patent: May 24, 2022

(54) ENERGY CURABLE COMPOSITIONS COMPRISING REACTION PRODUCTS OF POLY(ALKYLENE OXIDE)-CONTAINING GLYCIDYL ETHERS AND ACRYLIC ACID

(71) Applicant: SUN CHEMICAL CORPORATION, Parsippany, NJ (US)

(72) Inventors: Derek Ronald Illsley, Bath (GB); Jürgen Dieker, Karlstein am Main (DE)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/047,737

(22) PCT Filed: Jul. 1, 2019

(86) PCT No.: PCT/GB2019/051860
§ 371 (c)(1),
(2) Date: Oct. 15, 2020

(87) PCT Pub. No.: WO2020/053543
PCT Pub. Date: Mar. 19, 2020

(65) Prior Publication Data
US 2021/0108096 A1    Apr. 15, 2021

Related U.S. Application Data

(60) Provisional application No. 62/821,574, filed on Mar. 21, 2019, provisional application No. 62/818,772, filed on Mar. 15, 2019, provisional application No. 62/760,142, filed on Nov. 13, 2018, provisional application No. 62/729,097, filed on Sep. 10, 2018.

(51) Int. Cl.
| | | |
|---|---|---|
| C09D 11/101 | (2014.01) |
| B41M 5/00 | (2006.01) |
| B41M 7/00 | (2006.01) |
| C08G 65/00 | (2006.01) |
| B41J 11/00 | (2006.01) |
| B41M 5/52 | (2006.01) |
| C09D 11/107 | (2014.01) |
| B41J 2/21 | (2006.01) |

(52) U.S. Cl.
CPC .......... C09D 11/101 (2013.01); B41J 2/2107 (2013.01); B41J 11/00214 (2021.01); B41M 5/0023 (2013.01); B41M 5/52 (2013.01); B41M 7/0081 (2013.01); C08G 65/002 (2013.01); C09D 11/107 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | |
|---|---|---|
| 9,550,898 B2 | 1/2017 | Loccufier |
| 9,701,856 B2 | 7/2017 | Loccufier |
| 9,714,355 B2 | 7/2017 | Illsley |
| 9,796,865 B2 | 10/2017 | Claes |

(Continued)

FOREIGN PATENT DOCUMENTS

| | | |
|---|---|---|
| CN | 101974143 | 2/2011 |
| CN | 103588956 | 2/2014 |

(Continued)

OTHER PUBLICATIONS

International Search Report issued in International Application No. PCT/GB2019/051860, dated Sep. 10, 2019.

(Continued)

*Primary Examiner* — Manish S Shah
(74) *Attorney, Agent, or Firm* — Marian E. Fundytus; Ostrolenk Faber LLP.

(57) ABSTRACT

The present invention is drawn to low migration energy-curable compositions including epoxy acrylates derived from the reaction of poly(alkylene oxide) containing glycidyl ethers with acrylic acid. The compositions of the invention are particularly useful for the printing or coating of food packaging.

19 Claims, No Drawings

(56) References Cited

U.S. PATENT DOCUMENTS

| | | | | |
|---|---|---|---|---|
| 2003/0134931 A1* | 7/2003 | Chatterjee | ............. | C08F 283/00 522/178 |
| 2004/0244907 A1* | 12/2004 | Hutter | ....................... | B65C 9/22 156/277 |
| 2007/0142492 A1* | 6/2007 | Odell | .................... | C09D 11/101 522/74 |
| 2012/0199029 A1* | 8/2012 | Fukuura | ............... | C09D 11/101 101/491 |
| 2014/0106082 A1 | 4/2014 | Cattron | | |
| 2015/0376424 A1* | 12/2015 | Illsley | ................. | C09D 11/101 347/20 |
| 2017/0015856 A1 | 1/2017 | Illsley | | |

FOREIGN PATENT DOCUMENTS

| | | |
|---|---|---|
| CN | 104610860 | 5/2015 |
| EP | 70253 | 1/1983 |
| EP | 0 588 533 A2 | 3/1994 |
| EP | 2 489 709 A1 | 8/2012 |
| JP | 2000 072832 A | 3/2000 |
| JP | 05216228 | 10/2008 |
| WO | WO 02/081577 A1 | 10/2002 |
| WO | WO2017151137 | 9/2017 |
| WO | WO2017180496 | 10/2017 |

OTHER PUBLICATIONS

Written Opinion of the International Searching Authority issued in International Application No. PCT/GB2019/051860, dated Sep. 10, 2019.
International Preliminary Report on Patentability (Chapter II of the Patent Cooperation Treaty) issued in International Application No. PCT/GB2019/051860, dated Aug. 3, 2020.
B. Huang et.al., (Huagong Jinzhan (2004), 23(7), 743).
T. Nishikubo et al., (J.Appl.Polym.Sci (1974), 18(11), 3445).
J.Li et. al. (Polymer Bulletin (Heidelberg, Germany) (2016), 73(2), 571).

* cited by examiner

ENERGY CURABLE COMPOSITIONS COMPRISING REACTION PRODUCTS OF POLY(ALKYLENE OXIDE)-CONTAINING GLYCIDYL ETHERS AND ACRYLIC ACID

CROSS REFERENCE TO RELATED APPLICATIONS

The present application is a § 371 National Phase application based on PCT/GB2019/051860 filed Jul. 1, 2019, which claims the benefit of U.S. Provisional Application Nos. 62/729,097 filed Sep. 10, 2018, 62/760,142 filed Nov. 13, 2018, 62/818,772 filed Mar. 15, 2019 and 62/821,574 filed Mar. 21, 2019, the subject matter of each of which is incorporated by reference in their entirety.

The present invention relates to energy-curable compositions comprising glycidyl ethers of poly(alkylene oxide) polyols with acrylic acid and their use to lower the amount of uncured monomer in energy-cured compositions.

The preparation of epoxy acrylates by the reaction of polyethylene glycol) diglycidyl ether or polypropylene glycol) diglycidyl ether with acrylic acid and their subsequent use in UV-curable compositions has been reported in the several background references. J. Li et. al. (Polymer Bulletin (Heidelberg, Germany) (2016), 73(2), 571) used the product of PEGDGE with acrylic acid in compositions for UV-curable 3D-printing. B. Huang et.al., (Huagong Jinzhan (2004), 23(7), 743) reported that the product of PEGDGE and acrylic acid conferred greater flexibility than conventional epoxy acrylates. JP05216228 again reported on the flexibility achieved in UV-curable compositions comprising PEGDGE and acrylic acid. CN103588956 describes the synthesis of an epoxy acrylate from the reaction of PPGDGE and acrylic acid. Again, the flexibility benefits of the use of this epoxy acrylate were reported. The flexibility of the PPGDGE and acrylic acid adduce has also been advantageously used in UV-curable coatings for optical fibers; JP2001031731.

CN104610860 describes how the adduct of PEGDGE with acrylic acid can be further reacted with ethylenically unsaturated acid anhydrides to produce acid-functional oligomers that are alkali washable.

CN101974143 describes how adducts of PPGDGE, along with epoxidized bisphenol A can in a first step be reacted with acrylic acid and in a second step further reacted with maleic anhydride to produce, after neutralization of the carboxylic acid groups, a water-dispersible oligomer.

EP70253 describes how water-dilutable oligomers can be produced by the reaction of blends of epoxy resins, including PPGDGE, with acrylic acid.

T. Nishikubo et. al. (J.Appl.Polym.Sci (1974), 18(11), 3445) describes UV-curable aliphatic epoxy acrylates, for example via the reaction of dipropylene glycol diglycidyl ether with acrylic acid.

Thus, although the preparation of epoxy acrylates via the reaction of PEGDGE or PPGDGE with acrylic acid, and their use in UV-curable compositions is well known, the capacity of such materials to induce a significant lowering of the amount of uncured monomer in both UV and EB-curable inks and coatings has not been revealed in the identified references. It is this aspect that the current invention covers.

It is worthwhile to consider the generally accepted wisdom with respect to the preparation of energy-curable compositions for low migration printing and coating applications. It is commonly accepted that monomers and oligomers having high acrylate functionality should preferably be used. This accepted wisdom was challenged in US20170015856. where it was shown that highly alkoxylated acrylate monomers, such as polyethylene) glycol diacrylates ('PEGDA') could induce a lowering of the amount of uncured monomer in UV-curable inkjet compositions. Similarly, WO2017180496 shows how such monomers can be used in EB-curable inkjet compositions. What the current invention demonstrates, and supported by way of the examples, is that adducts of PEGDGEs with acrylic acid are even more effective in reducing the amount of uncured monomer in energy-curable compositions than a PEGDA having a similar chain length poly(ethylene oxide) backbone component. This is a surprising finding, and one not anticipated by the references.

With respect to EB-curable inkjet compositions, WO2017151137 reveals the use of monohydroxyl-functional monoacrylate monomers, such as hydroxybutyl acrylate. The inventors have shown that the epoxy acrylates of the current invention promote both EB-cure more substantially than does hydroxybutyl acrylate.

A number of patents describe UV-curable low migration inkjet compositions. U.S. Pat. No. 9,714,355 describes compositions comprising blends of low migration photoinitiators, including type I (cleavage) photoinitiators. U.S. Pat. No. 9,550,898 similarly describes UV-curable low migration inkjet compositions which also contain acylphosphine oxide photoinitiators as the type I photoinitiator. U.S. Pat. No. 9,796,865 describes UV-curable low migration inkjet compositions comprising hybrid monomers such as 2-(2-Vinyloxyethoxy)ethyl acrylate ('VEEA'). U.S. Pat. No. 9,701,856 describes how inkjet compositions comprising essentially VEEA as the only monomer can be combined with thiols to deliver low migration printable solutions. However, none of these patents reveals the benefit of introducing epoxy acrylates according to the current invention, particularly their capacity to reduce the amount of uncured monomer.

From the identified references it seems that the capacity of the reaction products of poly(alkylene oxide) polyol glycidyl ethers, such as the reaction products of PEGDGE or PPGDGE with acrylic acid, to produce a lowering of the amount of uncured monomer in UV and EB-curable inks and coatings has not been disclosed. This is a surprising finding, and the inventors have found that such epoxy acrylate monomers enable ink and coating compositions to produce lower amounts of uncured monomer in the cured compositions than comparable alkoxylated monomers, such as poly (ethylene glycol) diacrylates, as revealed in US20170015856.

Although the inventors have identified references describing the use of such epoxy acrylates in UV-curable compositions, their use has largely revolved around the flexibility that such monomers may confer on a cured ink or coating, with no indication of their clear usefulness in low migration energy-curable inks and coatings. An objective of the present invention is to reduce the amount of contamination from cured inks/coatings in packaging applications. The present invention addresses this problem via the reduction or elimination of migratory compounds which are present in conventional inks/coatings and which cause contamination (and particularly compounds with a low migration limit). Thus, compositions of the current invention are specifically directed towards applications requiring low migration of uncured materials, including the printing coating of food packaging and pharmaceutical packaging.

Furthermore, none of the identified references has revealed the use of such materials in election beam curable ink and coating compositions. The inventors have found that not only do such compounds enable a reduction in the amount of uncured monomer they can also allow the use of lower EB doses to achieve similar degrees of cure, when compared with compositions which do not contain such materials. This latter finding indicates that EB-curable inventive compositions, producing equivalent cure at lower EB doses, could enable faster press speeds, which would be advantageous.

Although primarily directed towards energy-curable inkjet compositions it should be understood that the invention covers inks and coatings applied by any other method including, but not limited to, energy-curable flexo inks, energy-curable offset inks, energy-curable overprint varnishes.

Thus, the current invention describes the surprising finding that the reaction products of glycidyl ethers of poly(alkylene oxide) polyols, including PEGDGEs and PPGDGEs, with acrylic acid, can lead to a significant lowering of the amount of uncured monomer in energy-curable compositions after curing. The current invention addresses the need for energy-curable inks and coating compositions to produce the lowest possible amount of uncured monomer and oligomer species after energy-curing.

It should be further noted that no references have described the use of such adducts in electron beam (EB) curable compositions. The inventors have found that the adduct of PEGDGE and acrylic acid induces significant lowering of the amount of uncured monomer in both UV and EB-curable compositions. The finding that such products induce a significant lowering of the amount of uncured monomer (and or oligomer) in EB-curable compositions is advantageous with respect to low migration compositions since EB-curable compositions require no, or little photoinitiator, as part of their make-up. Thus, said EB-curable compositions are essentially free of photoinitiators. Photoinitiators, and their photodecomposition products, even where low migration potential types are used, pose a significant migration risk from any cured ink or coating.

Commercially, a broad range of epoxy acrylate oligomers for energy-curing are available. These are predominantly aromatic epoxy acrylates derived by the reaction of the glycidyl ethers of bisphenol with acrylic acid and are known for their high reactivity and toughness. Aromatic epoxy acrylates based on the reaction products of epoxy novolacs and acrylic acid are also well known. Aliphatic epoxy acrylates, such as the reaction products of butanediol diglycidyl ether and acrylic acid are also available.

DETAILED DESCRIPTION OF THE INVENTION

According to the present invention, there is provided an energy-curable composition comprising epoxy acrylates derived from the reaction of poly(alkylene oxide)-containing glycidyl ethers with acrylic acid, wherein the average degree of alkoxylation of any poly(alkylene oxide) of the glycidyl ether is at least 2 and the number of glycidyl ether groups per molecule is at least 1. The composition may be described as a low migration composition.

It is clear from the identified references that, as well as the generally accepted wisdom, the use of epoxy acrylates according to the current invention in enabling energy-curable compositions producing reduced amounts of uncured monomer after UV or EB-curing, is surprising and not predictable. Indeed, no instances of the use of such epoxy acrylates in low migration energy-curable inks or coatings have been identified.

Compositions according to the invention will be advantageous in printing and coating applications where the maximum conversion of monomers and oligomers is desirable, such as the printing and coating of food packaging.

As well as enabling energy-curable compositions producing lower amounts of uncured monomer in the cured composition compared with suitable controls, the inventors have also shown that inventive compositions may also be cured at lower energy doses than control compositions whilst delivering similar or lower levels of uncured monomer. Again, this is a most useful findings as it indicates that faster throughput, in terms of press speed for instance, may be achievable with inventive compositions.

Since the inventive compositions enable a significant reduction in the amount of uncured monomer, then in instances where the compositions are UV-cured with the use of photoinitiators then a reduction in the amount of photoinitiator required to produce the same degree of cure, as denoted by the amount of uncured monomer, compared with compositions not comprising epoxy acrylates of the current invention, will be achievable. The examples provided by the inventors reveal UV-curable inkjet compositions which achieve satisfactory cure at acceptable doses with a total photoinitiator concentration of less than 5.0% (w/w)—a most surprising finding.

The present invention is drawn to low migration energy-curable compositions comprising epoxy acrylates derived from the reaction of poly(alkylene oxide) containing glycidyl ethers with acrylic acid. Such epoxy acrylates comprise poly(alkylene oxide) sub-units where the average degree of alkoxylation for any poly(alkylene oxide) chain is 2 or greater, and where the average number of acrylate groups per molecule is at least one. Suitable poly(alkylene oxide) containing glycidyl ethers used in the preparation of the epoxy acrylates according to the invention include, but are not limited to; poly(ethylene glycol) diglycidyl ether, polypropylene glycol) diglycidyl ether, ethoxylated or propoxylated trimethylolpropane glycidyl ethers, ethoxylated or propoxylated ditrimethylolpropane glycidyl ethers, ethoxylated or propoxylated pentaerytritol glycidyl ethers, ethoxylated or propoxylated dipentaerythritol glycidyl ethers.

The compositions of the invention are particularly useful for the printing or coating of food packaging and may be applied via any printing or coating method, although inkjet printing is a preferred method.

Definitions

Energy Curing—refers to either UV or EB-curing, although covers the use of any other actinic radiation.

UV curing—in the context of the current invention, is a process that uses UV light to initiate the free radical polymerization of ethylenically unsaturated monomers and oligomers. This can be achieved with any selection of UVA, UVB and UVC light and may be achieved via the optional incorporation of photoinitiators. It should be understood that the invention, although directed towards curing under UV light, also encompasses visible light. Non-limiting UV sources such as the following can be used; low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention.

EB Curing—compositions prepared according to the present invention are suitable for curing under the action of electron beam (EB) radiation. EB airing describes the use of electron beam radiation to polymerize a combination of monomers and oligomers. In the case of the invention the monomers and oligomers used are those which polymerise free radically, and hence contain ethylenically unsaturated groups, such as acrylate.

Monomer—a monomer in the context of the invention is any species, including what are referred to as oligomers, bearing any number of ethylenically unsaturated groups, Although the invention is primarily directed towards those monomers bearing acrylate groups it should be understood that any other ethylenically unsaturated group is covered by the invention, including but not limited to; methacrylate, vinyl ether, propenyl ether, maleate, alkene, acrylamide.

Low Migration—the compositions of the current invention lend themselves to applications including tire printing of food packaging, pharmaceutical packaging, personal care and household packaging, display boards in supermarkets, etc. In all these applications it is advantageous that the UV or EB-cured ink or coating contains minimal amounts of uncured material that could leach ('migrate') out of the ink into the surrounding environment thereby causing unwanted contamination. This is of particular concern for food packaging where any contamination of the packaged food from undesirable, migratable, ink components should be minimized.

PEGDGE and PPGDGE—poly(ethylene glycol) diglycidyl ether and polypropylene glycol) diglycidyl ether.

Alkoxylation—the invention is principally directed towards glycidyl ethers comprising poly(ethylene oxide) (otherwise referred to as poly(ethylene glycol)) or poly(propylene oxide) (otherwise referred to as poly (propylene glycol)) sub-units. However, it should be understood that glycidyl ethers comprising poly(butylene oxide) and higher poly(alkylene oxide) sub-units are also covered by the invention. An aspect of the invention is that the average degree of alkoxylation of any poly(alkylene oxide) group should preferably be 2, or greater.

Glycidyl ether—it should be understood that that the term glycidyl ether can be interchangeably used with the term epoxy. Any epoxy-functional poly(alkylene oxide) containing compound that may react with acrylic acid to produce epoxy acrylates according to the invention may be used. Glycidyl ethers are typically produced by the reaction of alcohol with epichlorohydrin.

Hydroxy Value—is defined as the amount of potassium hydroxide (in number of milligrams) required to neutralize the acetic acid taken up on acetylation of one gram of a chemical substance that contains free hydroxyl groups.

Molecular Weight. Unless otherwise stated, a reference to "molecular weight" or "average molecular weight" is preferably to the number average molecular weight ($M_n$). The molecular weight can be measured by those techniques known in the art such as gel permeation chromatography. For instance, molecular weight determination may be conducted on a Hewlett-Packard 1050 Series HPLC system equipped with two GPC Ultrastyragel columns, 103 and 104 Å (5 μm mixed, 300 mm×19 mm, Waters Millipore Corporation, Milford, Mass., USA) and THF as mobile phase. Preferably, molecular weight is calculated by comparison with a polystyrene standard. The skilled person will appreciate that this definition of molecular weight applies to polymeric materials which typically have a molecular weight distribution.

The invention describes the most surprising finding that epoxy acrylates produced by the reaction of poly(alkylene oxide)-containing glycidyl ethers with acrylic acid can promote the cure of compositions comprising monomers and oligomers bearing ethylenically unsaturated groups, such as acrylates, under the action of UV or EB radiation. This surprising finding realizes its effect by delivering lower amounts of uncured monomer after curing compared with compositions that do not contain such compounds. This finding, to the best of the inventors' knowledge has not been previously described or alluded to in the references. The finding has particular relevance for applications such as the printing of food packaging, which require that any ink or coating after application has low levels of substances that might migrate from the ink and/or coating and thence contaminate the surrounding environment, in the case of food packaging, the foodstuff itself. With the increasing awareness of the potential for contamination risks associated with food packaging, then any printing/coating process that can deliver an acceptably low migration risk has considerable worth. The current invention, via the use of compositions comprising epoxy acrylates according to the invention, provides a solution in this respect. The inventors have demonstrated this finding through UV and EB-curable inkjet compositions comprising the reaction product of a PEGDGE and acrylic acid. However, it should be understood that the invention covers the use of any epoxy acrylate derived from the reaction of a poly(alkylene oxide) comprising glycidyl ether with acrylic acid. Thus, other poly(alkylene oxide) comprising glycidyl ethers which may be used to prepare epoxy acrylates according to the invention include, but are not limited to; poly(propylene glycol) diglycidyl ether, poly (butylene glycol) diglycidyl ether, ethoxylated or propoxylated trimethylolpropane glycidyl ether, ethoxylated or propoxylated ditrimethylolpropane glycidyl ether, ethoxylated or propoxylated glycerol glycidyl ether, ethoxylated or propoxylated pentaerythritol glycidyl ether, ethoxylated or propoxylated dipentaerythritol glycidyl ether. The corresponding glycidyl ethers of poly (butylene glycol)-containing glycerol, trimethylolpropane, ditrimethylolpropane, pentaerythritol and dipentaerythritol are also within the scope of the invention. The only stipulation on the selection of the glycidyl ether is that the average number of glycidyl ethers per molecule should preferably be at least one and that the average degree of alkoxylation for any poly(alkylene oxide) sub-unit should preferably be at least two.

The inventors, by way of the examples, have shown that an epoxy acrylate derived from the reaction of PEGDGE with acrylic acid ('PEGDGE-AA'), produces a significant lowering of the amount of uncured monomer in both UV-curable and EB-curable (inkjet) compositions compared with a control composition free of its inclusion. Furthermore, the inventors have also shown that this capacity to reduce the amount of uncured monomer was greater than a poly(ethylene glycol) diacrylate possessing the equivalent polyethylene glycol) chain as part of its backbone. Yet further, the inventors have also shown that the PEGDGE-AA epoxy acrylate also produced a significant lowering of uncured monomer compared with an epoxy acrylate derived from the reaction of butanediol diglycidyl ether and acrylic acid. These latter two findings are key in demonstrating that the benefit of the use of epoxy acrylates according to the invention in reducing the amount of uncured monomer in any ink or coating is due to two factors; the presence of the poly(alkylene oxide) group and the secondary alcohol produced from the ring-opening of the epoxy group of the glycidyl ether. This finding has not been revealed or alluded to in any of the identified references, and to the best of the inventors' knowledge is a finding that the current state of the art understanding in the area would not anticipate. Although the potential for monomers comprising poly(alkylene oxide)

groups as part of their chemical structure to reduce the amount of uncured monomer has been revealed, the further benefit that accrues from secondary alcohol produced by the ring-opening of the epoxy after reaction with acrylic acid has not been anticipated.

As previously mentioned, epoxy acrylates according to the current invention are able to produce a lowering of the amount of uncured monomer in both UV and EB-curable compositions. The inventors do not wish to be drawn to any particular theory as to why such epoxy acrylates should be so effective but, apart from the presence of the poly(alkylene oxide) sub-units of the molecule postulate that the pendant alcohols of these compounds are, in one respect, able to act as co-initiators of free radical polymerization. They may achieve this via a transfer process at the carbon adjacent to the hydroxy group which is likely to be a H-transfer process. Thus, the secondary alcohols of the epoxy acrylates of the invention may act synergistically with photoinitiators to produce free radicals that may initiate the polymerization of ethylenically unsaturated monomers and oligomers. It can be readily envisaged that substances comprising more than one alcohol group as part of their structure would have the capacity to form a plurality of free radicals via this postulated free radical transfer process. This would lead to the potential formation of a more highly crosslinked network during the energy-curing process, which conventional wisdom indicates would lead to a lowering of the amount of uncured monomers and oligomers in any cured coating/ink composition. For electron beam curing, again, the alcohols of the partially acrylated polyol may take part in the initiation process through possible cleavage reactions at the alcohol, or adjacent α-carbon, under electron impact, to produce initiating radicals. The potential for epoxy acrylates of the invention to participate in chain transfer processes may also account for their ability to help improve the surface cure of UV-curable compositions in air. This may result from H-transfer from the partially acrylated polyol to stable peroxy radicals (produced by reaction of oxygen with a propagating radical) to produce reactive radicals which can re-initiate polymerization.

The inventors have found that the introduction of as little as 2.5% (w/w) of an epoxy acrylate according to the invention can produce a significant reduction in the amount of uncured monomer compared with control compositions. For EB-curable compositions it was found possible to achieve the same degree of cure, or better, at significantly lower EB doses. In one aspect an EB-curable composition according to the current invention was found to deliver the same cure at 25 kGy, as did a composition free of any epoxy acrylate according to the invention at 35 kGy, a considerable improvement in the cure speed.

As noted above, the inventors have demonstrated a significant reduction in the amount of uncured monomer in a UV-curable inkjet composition comprising just 2.5% of the PEGDGE-AA epoxy acrylate (based on PEG400 diglycidyl ether). It should be understood that there is no restriction on the amount of epoxy acrylate according to the invention used in any composition, so long as it produces an observable lowering of the amount of uncured monomer when compared with compositions free of its use. However, it is preferred that at least 2.0% (w/w) be used in any energy-curable composition and more preferably at least 4.0% (w/w).

The epoxy acrylate is preferably present in an amount of no more than 30.0% (w/w), preferably no more than 25.0% (w/w), preferably no more than 20.0% (w/w), and typically no more than 15.0 (w/w) of the composition. Preferably, the epoxy acrylate is present in a range of from 2.0% (w/w) to 30.0% (w/w), preferably from 4.0% (w/w) to 20.0% (w/w) of the composition, preferably from 4.0% (w/w) to 15.0% (w/w).

Based on the likely structure for this PEGDGE-AA epoxy acrylate it would contribute, by way of its alcohol groups, an equivalent hydroxy value to the ink of 5.5 mgKOH/g. Thus, a further aspect of the invention is that the hydroxy value of the inventive compositions contributed by the epoxy acrylate according to the invention should preferably be at least 5.0, and more preferably greater than 10.0 mgKOH/g equivalent. The inventors have calculated the theoretical hydroxy values of a number of the inventive examples to substantiate this.

Although compositions according to the invention are especially suited to flexographic and more particularly inkjet ink compositions, it should be understood that coatings and inks applicable by any other method are covered by the invention. For example, UV or EB-curable offset inks and coatings applied by roller, spray or curtain coating methods.

In yet a further aspect of the invention, compositions of the current invention may optionally comprise any blend of photoinitiators. Such compositions may then be cured by UV or a combined UV and EB curing process, as revealed by WO2017/180491 and WO2017/180496, which processes are incorporated in their entirety into the current invention. Where the inks or coatings of the invention are intended for the application to food packaging then those photoinitiators having low migration potential should be used. Suitable photoinitiators will be described subsequently.

Compositions of the invention may comprise any blend of ethylenically unsaturated monomers and oligomers. It will be appreciated that the term "any blend of ethylenically unsaturated monomers and oligomers" means that the composition can comprise one or more of such monomers and or one or more of such oligomers, and preferably comprises at least one ethylenically unsaturated monomer and at least one ethylenically unsaturated oligomer. Where the compositions are intended for the printing or coating of food packaging it is preferred that the concentration of monofunctional monomers be less than 20%, more preferably less than 10% and most preferably less than 5% by weight of the total composition.

There is no restriction on the type, blend or concentration of free radical photoinitiators used and can include any of, but not limited to the following (and combinations thereof): α-hydroxy ketones such as: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-Hydroxy-1-[1-[4-(2-hydroxy-2-methylpropanoyl)phenyl]-1,3,3-trimethylindan-5-yl]-2-methylpropan-1-one and 2-Hydroxy-1-[4-[4-(2-hydroxy-2-methylpropanoyl)phenoxy]phenyl]-2-methylpropan-1-one;

acylphosphine oxides such as; 2,4,6-trimethylbenzoyl-diphenylphosphine oxide; ethyl (2,4,6-trimethylbenzoyl) phenyl phosphinate, bis-(2,4,6-trimethylbenzoyl)-phenylphosphine oxide; and bis(2,6-dimethoxybenzoyl)-2,4,4-trimethylpentylphosphinoxide.

α-aminoketones such as; 2-methyl-1-[4-(methylthio)phenyl]-2-morpholinopropan-1-one; 2-benzyl-2-dimethyl-amino-1-(4-morpholinophenyl)-butan-1-one; and 2-dimethylamino-2-(4-methyl-benzyl)-1-(4-morpholin-4-yl-phenyl)-butan-1-one;

thioxanthones such as; 2-4-diethylthioxanthone, isopropylthioxanthone, 2-chlorothioxanthone, and 1-chloro-4-propoxythioxanthone;

benzophenones such as; such as benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate and 1-[-4-[benzoylphenylsulpho]phenyl]-2-methyl-2-(4-methylphenylsulphonyl)propan-1-one;

phenylglyoxylates such as; phenyl glyoxylic acid methyl ester; oxy-phenyl-acetic acid 2-[hydroxyl-ethoxy]-ethyl ester, or oxy-phenyl-acetic acid 2-[2-oxo-2-phenyl-acetoxy-ethoxy]-ethyl ester;

oxime esters such as; 1-phenyl-1,2-propanedione-2-(O-ethoxycarbonyl)oxime; [1-(4-phenylsulfanylbenzoyl)heptylideneamino]benzoate, or [1-[9-ethyl-6-(2-methylbenzoyl)carbazol-3-yl]-ethylideneamino]acetate;

Examples of other suitable photoinitiators include diethoxy acetophenone; benzil; benzil dimethyl ketal; titanocen radical initiators such as titanium-bis(n 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

An amine synergist may also be optionally included in the formulation. Suitable examples include, but are not limited to. the following: Aromatic amines such as; 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid, with ethyl, amyl, 2-butoxyethyl and 2-ethylhexyl esters being particularly preferred; other positional isomers of N,N-dimethylamino)benzoic acid esters are also suitable;

Aliphatic amines such as N-methyldiethanolamine, triethanolamine and triisopropanolamine;

Also aminoacrylates and amine modified polyether acrylates, including but not limited to; EBECRYL™ 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER™ 5142, GENOMER 5161, GENOMER 5271 and GENOMER 5275 from RAHN; PHOTOMER™ 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER PO77F, all available from BASF; AGISYN 701, AGISYN 702, AGISYN 703, NeoRad™ P-81 and NeoRad P-85 ex DSM-AGI.

Polymeric photoinitiators and sensitizers are also suitable, including, for example, polymeric aminobenzoates (GENOPOL™ AB-1 or AB-2 from RAHN, Omnipol ASA from IGM or Speedcure™ 7040 from Lambson), polymeric benzophenone derivatives (GENOPOL™ BP-1 or BP-2 from RAHN, Omnipol™ BP, Omnipol BP2702 or Omnipol 682 from IGM or Speedcure 7005 from Lambson), polymeric thioxanthone derivatives (GENOPOL TX-1 or TX-2 from RAHN, Omnipol TX from IGM or Speedcure 7010 from Lambson), polymeric aminoalkylphenones such as Omnipol 910 from IGM; polymeric benzoyl formate esters such as Omnipol 2712 from IGM; and the polymeric sensitizer Omnipol SZ from IGM.

Since the compositions of the current invention are intended for use in low migration applications printing and coating applications it is preferred that photoinitiators having low migration potential are used. Therefore, polymeric, polymerizable and multifunctional types are preferred.

Compositions according to the invention may comprise any amount of any blend of free radically polymerizable monomers and oligomers.

Examples of suitable monofunctional ethylenically unsaturated monomers include but are not limited to the following (and combinations thereof), where the terms ethoxylated refers to chain-extended compounds through the use of ethyleneoxide, propoxylated refers to chain-extended compounds through the use of propylene oxide, and alkoxylated refers to chain-extended compounds preferably using either or both ethyleneoxide and propylene oxide. Equivalent methacrylate compounds are also capable of being used, although those skilled in the art will appreciate that methacrylate compounds have lower reactivity than their equivalent acrylate counterparts:

isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acylate: stearyl acrylate; isostearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate: alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate: 2-carboxyethyl acrylate; 4-hydroxy butyl acrylate.

Since compositions prepared according to the current invention are preferably intended for low migration printing and coating applications, including the printing and coating of food packaging, then the amount of any monofunctional monomer used should preferably be limited so as to reduce the risk associated with the migration of uncured monomer present in a UV-cured ink or coating. Therefore, another aspect of the invention is that the amount of arty individual monofunctional monomer should preferably be 20% (w/w) or less, more preferably 10% (w/w) or less, and most preferably 5% (w/w) less of the total composition.

Where monomers are used in the preparation of inventive compositions it is preferable that they be multifunctional with respect to their polymerizable groups. Multifunctional monomers, having 2 or more ethylenically unsaturated groups, such as acrylate, have a greater probability of reacting into the UV-cured ink or coating compared with a monofunctional monomer, thereby reducing the risk of potential contamination arising from uncured monomer. Examples of suitable multifunctional ethylenically unsaturated monomers include but are not limited to the following (and combinations thereof), where the terms ethoxylated refers to chain-ex tended compounds through the use of ethyleneoxide, propoxylated refers to chain-extended compounds through the use of propylene oxide, and alkoxylated preferably refers to chain-extended compounds using either or both ethyleneoxide and propylene oxide. Equivalent methacrylate compounds are also capable of being used, although those skilled in the art will appreciate that methacrylate compounds have lower reactivity than their equivalent acrylate counterparts:

1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate: polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaacrylate; ethoxylated dipentaerythritol hexaacrylate.

Examples of monomers comprising free-radically polymerizable groups other than acrylate include N-vinyl amides. Examples of N-vinyl amides include but are not limited to N-vinylcaprolactam (NVC), N-vinyl pyrollidone (NVP), diacetone acrylamide, N-vinyl carbazole, N-acryloxyoxy ethylcyclohexanedicarboximide, N-vinyl imidazole, N-vinyl-N-methylacetainide (VIMA) or acryloyl morpholine (ACMO). Vinyl ethers such as 2-(2-vinyloxyethoxy)ethyl (meth)acrylate (VEEA, VEEM), diethylene glycol divinyl ether(DVE2), triethylene glycol divinyl ether (DVE3), ethyl vinyl ether, n-butyl vinyl ether, iso-butyl vinyl ether, tert-butyl vinyl ether, cyclohexyl vinyl ether (CHVE), 2-ethyl-hexyl vinyl ether (EHVE), dodecyl vinyl ether (DDVE), octadecyl vinyl ether(ODVE), 1-2-butanediol divinyl ether (BDDVE), 1-4,cyclohexanedimethanol divinylether (CHDM-di), hydroxybutyl vinylether (HBVE), 1-4-cyclohexanedimethanolmono vinylether (CHDM-mono), 1,2,4-trivinylcyclohexane (TVCH), vinylphosphonic acid dimethylester (VPA) or vinylphosphonic acid dimethyl ester (VPADME).

As well as, or in place of, free radically-polymerizable monomers any concentration and type of free-radically polymerizable oligomer, including but not restricted to polyurethane acrylates, polyester acrylates, polyether acrylates may be used. Epoxy acrylates, other than those covered by the invention may also be used, such as those derived from the glycidyl ethers of bisphenol A, and epoxy novolacs.

Where the compositions of the invention require colourants, suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83. 114, 126, 127, 150, 155, 174, 180. 188; Pigment Red Numbers 2, 22, 23, 48:1, 48:2, 52, 52:1, 53, 57:1, 112, 122, 166, 170, 184. 202, 266, 269; Pigment Orange Numbers 5, 16, 34, 36, 71; Pigment Blue Numbers 15, 15:3, 15:4; Pigment Violet Numbers 3, 19, 23, 27; and/or Pigment Green Number 7. Inorganic pigments may lie one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The energy-curable compositions of the invention may also contain other components which enable them to perform in their intended application. These other ink components include, but are not restricted to; stabilizers, wetting aids, slip agents, inert resins, antifoams, fillers, rheological aids, amine synergists, etc.

The compositions of the invention may also optionally comprise any blend of acrylic polymer or copolymer which is dissolved into it. These polymers are usually prepared by the (thermal) free radical polymerization of blends of monomers including, but not restricted to. styrene, butyl (meth) acrylate, ethyl (meth)acrylate, methyl (meth)acrylate, isobutyl (meth)acrylate. The acrylic polymer preferably has a number average molecular weight of less than 20,000 g/mole and more preferably less than 10,000 g/mole. The molecular weight of such polymers can be measured by those techniques known in the art such as gel permeation chromatography. Examples of acrylic polymers include those supplied from Dianal, Elvacite Rohm and Haas and DSM, amongst others. The acrylic polymer is preferably present in the compositions at a concentration of between 2 and 20% (w/w).

Where compositions according to the invention are intended for the printing or coating of food packaging or other sensitive applications, such as pharmaceutical packaging then if they incorporate photoinitiators then those photoinitiators having low migration potential should preferably be used. Any combination and concentration of low migration potential photoinitiators may be used and types include, but are not restricted to; polymeric, polymerizable, difunctional, multifunctional photoinitiators. Both type I and type II photoinitiators within those classes are suitable. Suitable polymeric photoinitiators have previously been described. Other photoinitiators suitable for low migration applications include, 1-[4-(2-Hydroxyethoxy)-phenyl]-2-hydroxy-2-methyl-1-propane-1-one, Oligo-[2-Hydroxy-2-methyl-I-((4-(1-methylvinyl)phenyl) propanone], Poly(oxy-1,2 ethanedyil)-alpha-(4-(dimethylamino)benzoyl)-omega-((4-(dimethylamino)benzoyl)oxy)-(9Cl), 2-Hydroxy-1-{4-[4-(2-hydroxy-2-methyl-propionyl)-benzyl]-phenyl}-2-methyl-propan-1-one, 2-hydroxy-1-[4-(4-(2-hydroxy-2-methylpropionyl)phenoxy)phenyl]-2-methyl propan-1-one. Photoinitiators which are suitable for low migration may include any of those listed in EUPIA's 'Suitability List of Photo-initiators for Low Migration UV Printing Inks and Varnishes', especially those in Group 1A and 1B. Any UV light source can be used including, but not limited to, UV-LED (including but not limited to those emitting UV light at 355, 365, 377, 385, 395 and 405 nm), high-pressure mercury bulb, a medium-pressure mercury bulb, a xenon bulb, a carbon arc lamp, a metal halide bulb, or sunlight. It should be appreciated by those skilled in the art that any UV light source may be used to cure compositions prepared according to the current invention.

A stabilizer may also be used in the composition to ensure good pot life of the ink, examples of which are nitroxy based stabilizers such as OHTEMPO, TEMPO, and Irgastab™ UV10. Phenolic stabilizers such as hydroquinone (HQ), methyletherhydroquinone (MEHQ), butylhydroxytoluene (BHT) and 2,6-di-tert-butyl-N,N-dimethylamino-p-cresol. Nitrosophenylhydroxylamine (NPHA) base inhibitors NPHA, amine salts, and metal salts (Al salt, N-PAL) plus the aromatic amine inhibitors diphenylamine(DPA) and phenylenediamine(PPD). Other suitable stabilizers are florstab UV-1, UV-8, Genorad™ 16 and 18.

Included in the ink formulation can be a suitable de-aerator, these prevent the formation of air inclusions and pinholes in the cured coating. These also reduce rectified diffusion which can cause reliability issues in the printhead. The following, non-limiting, products are available from EVONIK: TEGO AIREX™ 900, 910, 916. 920, 931, 936, 940, 944, 945, 950, 962, 980, 986.

Defoamers can also be included in the formulation, these prevent the formation of foam during manufacture of the ink and also while jetting. These are particularly important with recirculating printheads. Suitable, non-limiting, defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, 883, TEGO FOAMEX K3, TEGO FOAMEX K7/K8 and TEGO TWIN™ 4000 available from EVONIK. Available from BYK is BYK-066N, 088, 055, 057, 1790, 020, BYK-A 530, 067A, and BYK 354.

Surface Control Additives are often used to control the surface tension of the ink which is required to adjust the wetting on the face plate of the printhead and also to give the desired drop spread on the substrate or and in the case of multi pass inkjet printing wet on dry drop spread. They can also be used to control the level of slip and scratch resistance of the coating. Suitable surface control additives include but are not limited to TEGO FLOW300, 370, 425, TEGO GLIDE™ 100, 110, 130, 406, 410, 411, 415, 420, 432, 435, 440, 482, A115, B1484, TEGO GLIDE ZG 400, TEGO RAD2010, 2011. 2100, 2200N, 2250, 2300, 2500, 2600, 2650, 2700, TEGO TWIN™ 4000, 4100, TEGO WET 240, 250, 260, 265, 270, 280, 500, 505, 510 and TEGO WET™ KL245 all available from EVONIK. Available from BYK are BYK 333, 337, BYK UV3500, BYK 378, 347, 361, BYK UV3530, 3570. CERAFLOUR 998, 996, NANOBYK™ 3601, 3610, 3650 and CERMAT™ 258. From CYTEC EBECRYL 350, 1360, MODAFLOW™ 9200, EBECRYL 341. From SARTOMER the aliphatic silicone acrylate CN9800 may be used.

Where ink and coating compositions are applied to the (non-contact) surface of primary or secondary packaging intended for foodstuffs, then any contamination from the package impacting the foodstuff should fall within the guidelines set out by Article 3 of Regulation (EC) No 1935/2004 (supplemented by EC No 10/2011), as recommended by EUPIA, requiring that materials and articles in contact with food;

"shall be manufactured in accordance with good manufacturing practices, so that under normal or foreseeable conditions of use, they do not transfer their constituents to food in quantities which could:
endanger human health; or
bring about an unacceptable change in the composition of the food; or
bring about a deterioration in the organoleptic characteristics thereof"

EUPIA has recommended that Article 3 of this provision be followed when producing printed matter for food packaging and has produced a detailed guideline for the selection of raw materials intended for printing inks for food packaging, along with guidelines on the testing of printed matter to ensure that regulatory requirements are achieved. Where no SML exists for a specific component then the following migration limits apply;

"A target migration limit of no concern for non-evaluated substances of 10 ppb is the ultimate objective, to be consistent with other food contact materials.

In particular, a substance is acceptable if its specific migration does not exceed:
10 ppb, in case of insufficient toxicological data
50 ppb if three negative mutagenicity tests requested by EFSA4 Guidelines are available
above 50 ppb, if supported by favorable toxicological data and/or evaluation done in accordance with the EFSA Guidelines" (Extract from EuPIA Guideline on Printing Inks applied to the non-food contact surface of food packaging materials and articles, September 2009)

EUPIA also provides guidelines on how to measure the potential level of migratables arising from printed matter. For inks and coatings applied to the non-food contact surface of packaging (i.e. the outer surface), whether that be to the primary packaging or secondary packaging (labels and sleeves) then the most likely route for migratable species from the ink contaminating the foodstuff is by what is known as set-off migration. This is where printed matter is stacked or reeled prior to it being filled with food. Thus, the ink comes into contact with what will be the food-contact surface of the package and migratable components of the ink can diffuse into this surface. When the package is then filled with foodstuff, the contaminants from the ink which have diffused into the contact-surface of the package can then leach into the food causing a potential contamination issue.

Thus, any energy-curable fluid which is applied to either the primary or secondary packaging of foodstuff should not result in contamination of that foodstuff at levels exceeding the limits detailed above.

According to a farther aspect of the present invention there is provided a process for preparing a printed substrate comprising printing the composition as defined hereinabove onto a substrate and curing. To effect curing, the composition may be exposed to both UV and EB radiation. For instance the composition may be partially cured using any combination of UV-LED lamps, prior to EB-curing. In a particularly preferred embodiment, the composition is cured by EB radiation, i.e. by EB radiation rather than UV radiation. It will be appreciated that the foregoing description of the other aspects of the invention, including the preferences thereof, is equally applicable to this aspect of the invention too.

According to a further aspect of the present invention there is provided a printed article comprising a composition as defined hereinabove and/or which is obtainable by the printing process as defined hereinabove. Thus, it will be appreciated that the printed article in particular comprises a cured coating derived from a curable composition as defined hereinabove. The substrate of the printed article is preferably a plastic film. The printed article is preferably a food packaging article. It will be appreciated that the foregoing description of the other aspects of the invention, including the preferences thereof, is equally applicable to this aspect of the invention too.

According to a further aspect of the invention, there is provided a method of reducing the amount of uncured monomer in a cured ink or coating composition comprising applying the composition as defined herein to a substrate and curing. It will be appreciated that said reduction of the amount of uncured monomer is relative to a cured ink or coating composition which does not comprise the epoxy acrylates defined herein. It will be appreciated that the foregoing description of the other aspects of the invention, including the preferences thereof, is equally applicable to this aspect of the invention too.

According to a further aspect of the invention, there is provided the use of the epoxy acrylates defined herein to promote the energy-cure (preferably UV and/or electron beam cure) of a free-radically polymerizable composition. It will be appreciated that the foregoing description of the other aspects of the invention, including the preferences thereof, is equally applicable to this aspect of the invention too.

The invention is further described by the following numbered paragraphs:
1. Low migration energy-curable compositions comprising epoxy acrylates derived from the reaction of poly (alkylene oxide) containing glycidyl ethers with acrylic acid, wherein the average degree of alkoxylation of any poly(alkylene oxide) of the glycidyl ether is at least 2 and the number of glycidyl ether groups per molecule is at least 1.
2. The compositions of paragraph 1, wherein the poly (alkylene oxide) of the glycidyl ether is selected from either polyethylene oxide) or poly (propylene oxide) or a blend thereof.
3. The compositions of paragraph 2, wherein the glycidyl ether is a poly(ethylene glycol) diglycidyl ether.
4. The compositions of paragraph 2, wherein the glycidyl ether is a poly(propylene glycol) diglycidyl ether.
5. The compositions of paragraph 2, wherein the glycidyl ether is selected from the group consisting of ethoxylated or propoxylated trimethylolpropanes or pentaerythritols, or blends thereof.
6. The composition of any preceding paragraph, further comprising any blend of photoinitiators.
7. The composition of paragraph 6 which is UV-curable.
8. The composition of paragraph 7 which comprises 6.0% (w/w), or less, of any blend of photoinitiators.
9. The composition of any preceding paragraph which is EB-curable.
10. The composition of any preceding paragraph which is a pigmented inkjet fluid.
11. The composition of any preceding paragraph which comprises at least 2.0% (w/w), and preferably at least 4.0% (w/w) of the epoxy acrylate.
12. The composition of any preceding paragraph, wherein the epoxy acrylate raises the hydroxy value of the ink by at least 5.0, and more preferably by at least 10.0 mgKOH/g.
13. A printed article comprising a composition according to any one or more of paragraphs 1-12.
14. The printed article of paragraph 13 which is a plastic film.
15. The printed article of paragraph 13 which is a food packaging article.
1. A method of reducing the amount of uncured monomer in a cured ink or coating composition comprising applying the composition of any one or more of paragraphs 1-12 to a substrate and curing.

The present invention has been described in detail, including the preferred embodiments thereof. However, it will be appreciated that those skilled in the art. upon consideration of the present disclosure, may make modifications and/or improvements on this invention that fall within the scope and spirit of the invention.

EXAMPLES

The following examples illustrate specific aspects of the present invention and are not intended to limit the scope thereof in any respect and should not be so construed. These examples are illustrative and are not to be read as limiting the scope of the invention as it is defined by the appended claims.

Viscosity measured using a Brookfield DV-II+ Pro Viscometer equipped with Spindle no. 18, at 100 rpm.

Curing the Inks for Extraction Testing: For UV-curing, the inks were applied to 23 µm Melinex 813 (a polyester film) at 10 µm, and then cured with a dose of 150 mJ/cm$^2$, using a Fusion UV Systems UV-Rig equipped with a medium pressure H-bulb. The bell speed was adjusted to deliver the required U V-dose of 150 mJ/cm$^2$, as measured by a calibrated International Light Technologies ILT 490 Profiling Belt Radiometer (covering the UV-A and UV-B ranges).

For EB-curing, the inks were applied in the same manner as described above, but the inks were cured using an EBeam Technologies EBLab, using an accelerating voltage of 100 keV and the doses specified in the examples, with an oxygen level of less than 200 ppm.

Assessing the Level of Extractable Monomer: The levels of unbound, unreacted monomer residues in a print were determined by a 'total extraction' test. This test involved soaking 30cm$^2$ of the print in 2 ml of methanol, containing 0.005% (w/w) of MEHQ (stabilizer) for 24 hours at room temperature before the methanol solution was analyzed by GC-MS. The GC-MS was calibrated with known solutions of the monomers and the results are reported as the amount of uncured monomer per unit area of print, expressed as μg/dm².

Preparation of an Epoxy Acrylate According to the Invention: PEGDGE-AA

A 250-ml three-necked round bottom flask fitted with condenser, thermometer, gas inlet (used for air sparge with Teflon pipe), dropping funnel and stirrer was charged with 99.50 g (0.14 mol) PEG-400-DEG (a di-glycidyl ether with PEG-400 chain; product of Raschig GmbH, Germany), 0.2 g 4-methoxyphenol (polymerization-inhibitor), and 0.6 g triphenyl phosphine (catalyst). The reaction mixture was heated to 94° C. and air bubbled through the clear reaction mixture. 22 g (0.3 mol) acrylic acid was added dropwise to the mixture under stirring. After about 20 minutes, addition of the acid was complete. The reaction mixture was kept at 98° C. and the decrease of the acid number monitored. When the acid value fell below 5 mg KOH/g, the reaction mixture was allowed to cool to room temperature and the product was obtained without need for further purification as a clear liquid.

Yield: 115 g
Acid Value: <5 mgKOH/g
Viscosity: 334 mPa·s @25° C., 50 s⁻¹.

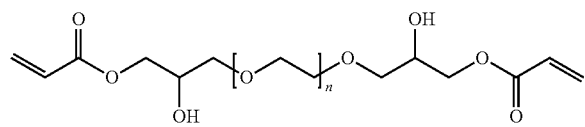

Ink Examples

Use of PEGPGE-AA to Enhance UV-Cure: To show how the PEGDGE-AA adduct can promote the UV-cure response, in terms of a reduction in the amount of uncured monomer, inkjet compositions were prepared according to Table 1. The inks were blended using a Silverson high shear mixer.

TABLE 1

UV-Curable Inkjet Composition - General Formula for Subsequent Examples

| Component | % (w/w) |
| --- | --- |
| VEEA[1] | 30.0 |
| 3-MePDDA[2] | 30.0 |
| TMPEOTA[3] | 6.5-16.5 |
| CN3715[4] | 3.0 |
| Additional Monomer[5] | 0-10.0 |
| Omnirad 819[6] | 0.5 |
| Esacure KIP160[7] | 2.0 |
| Onmirad 127[8] | 2.0 |
| TegoGlide 410[9] | 1.0 |
| Magenta Pigment Paste[10] | 15.0 |

Notes to Table 1:

[1]VEEA = 2-(2-vinyloxyethoxy)ethyl acrylate;

[2]3-MePDDA = 3-Methylpentanediol diacrylate;

[3]TMPEOTA = Trimethylolpropane ethoxylate triacrylate (3 moles ethoxylation). The concwentration of this monomer was adjusted downwards to allow the incorporation of the additional monomer (5);

[4]CN3715 = Acrylated Amine, ex. Sartomer;

[5]The additional monomer includes PEGDGE-AA and the two control monomers PEG400DA (PEG400 diacrylate) and BDDGE-AA, which is the adduct of butanediol diglycidyl ether with acrylic acid;

[6]Omnirad 819 = Acylphosphine oxide photoiniator, ex. IGM Resins;

[7]Esacure KIP160 = Low migration potential hydroxyketone photoinitiator, ex. IGM Resins;

[8]Omnirad 127 = Low migration potential hydroxyketone photoinitiator, ex. IGM Resins;

[9]TegoGlide 410 = Polyethersiloxane; ex. Evonik Industries;

[10]Magenta Pigment Paste = Proprietary Pigment dispersion comprising 21.0% Pigment Red 122, dipropylene glycol diacrylate, dispersants stabilisers.

Table 2 provides the results for the individual inks prepared according to Table 1, in terms of the additional monomer, the ink viscosity and the amount of uncured monomer.

TABLE 2

UV-Curable Inkjet Compositions and the Amount of Uncured Monomer

| | Additional Monomer | % (w/w) Additional Monomer | Hydroxy Value Contributed by Additional Monomer (mgKOH/ g (ink)) | Viscosity @ 45° C. (mPa · s) | Extractable DPGDA (μg/dm²) | Extractable 3-MePDDA (μg/dm²) | Extractable VEEA (μg/dm²) |
| --- | --- | --- | --- | --- | --- | --- | --- |
| Comp. Ex 1 | — | — | — | 6.8 | 16.7 | 36.7 | 38.3 |
| Comp. Ex 2 | BDDGE-AA | 2.5 | 8.1 | 7.1 | 9.2 | 16.8 | 20.8 |
| Comp. Ex 3 | BDDGE-AA | 5.0 | 16.2 | 7.5 | 5.1 | 9.7 | 11.0 |
| Comp. Ex 4 | BDDGE-AA | 10.0 | 32.4 | 10.6 | 1.1 | 1.4 | 2.1 |
| Comp. Ex 5 | PEG400DA | 2.5 | 0 | 7.0 | 2.1 | 3.5 | 4.4 |
| Comp. Ex 6 | PEG400DA | 5.0 | 0 | 7.0 | 2.2 | 3.8 | 5.5 |
| Comp. Ex 7 | PEG400DA | 10.0 | 0 | 7.1 | 1.4 | 2.7 | 3.2 |
| Inv. Ex 1 | PEGDGE-AA | 2.5 | 5.5 | 7.0 | 2.0 | 3.4 | 4.5 |
| Inv. Ex 2 | PEGDGE-AA | 5.0 | 11.0 | 7.2 | 1.3 | 1.8 | 3.0 |
| Inv. Ex 3 | PEGDGE-AA | 10.0 | 21.9 | 7.7 | <0.5 | <0.5 | 1.4 |

The results in Table 2 show that the low molecular weight epoxy acrylate BDDGE-AA produces a significant lowering of the amount of uncured monomer (Comparative Examples 2 to 4) compared with Comparative Example 1. This in itself is a surprising finding since it is used to replace TMPEOTA, a trifunctional acrylate monomer, which is known for its capacity to produce low migration energy-curable compositions. The fact that a trifunctional monomer is being replaced with a difunctional monomer might be expected to result in a reduction of the cure response with respect to the amount of uncured monomer in the cured ink film. The likely reason for the reduction in the amount of uncured monomer achieved with BDDGE-AA likely arises from the presence of the secondary alcohol groups in its chemical structure. A negative impact of the use of BDDGE, especially at 10.0% (w/w), is on the viscosity, which would limit its use in inkjet formulations particularly.

AA did not have the same negative impact on viscosity, an advantage for the preparation of inkjet compositions.

A further point to make about the inkjet compositions of Table 2 (which were UV-cured in air) is the relatively low overall photoinitiator concentration of 4.5% (w/w). Usually, UV-curable inkjet compositions comprise significantly higher concentrations of photoinitiators to deliver satisfactory cure. The ability of inventive compositions to achieve acceptable cure with such low concentrations of photoinitiators is clearly advantageous.

To show the positive impact that epoxy acrylates according to the invention can have on EB-curing, the inkjet compositions according to Table 3 were prepared and tested for the amount of uncured monomer according to the methodology previously described.

TABLE 3

| EB-Curable Inkjet Compositions and the Amounts of Uncured Monomer | | | | | | | |
|---|---|---|---|---|---|---|---|
| Component | Comp. Ex 8 | Comp. Ex 9 | Comp. Ex 10 | Inv. Ex 4 | Inv. Ex 5 | Inv. Ex 6 | Inv. Ex 7 |
| VEEA | 30.0 | 30.0 | 30.0 | 30.0 | 30.0 | 30.0 | 30.0 |
| 3-MePDDA | 35.0 | 35.0 | 35.0 | 35.0 | 35.0 | 35.0 | 35.0 |
| TMPEOTA | 21.0 | 6.0 | 6.0 | 16.0 | 11.0 | 6.0 | 1.0 |
| HBA[1] | — | 15.0 | — | — | — | — | — |
| SR9035[2] | — | — | 15.0 | — | — | — | — |
| PEGDGE-AA | — | — | — | 5.0 | 10.0 | 15.0 | 20.0 |
| CN3715 | 4.0 | 4.0 | 4.0 | 4.0 | 4.0 | 4.0 | 4.0 |
| TegoGlide 410 | 1.0 | 1.0 | 1.0 | 1.0 | 1.0 | 1.0 | 1.0 |
| Cyan Pigment Paste[3] | 9.0 | 9.0 | 9.0 | 9.0 | 9.0 | 9.0 | 9.0 |
| Total | 100 | 100 | 100 | 100 | 100 | 100 | 100 |
| Viscosity at 45° C. (mPa · s) | 5.2 | 4.3 | 6.3 | 5.6 | 6.1 | 6.3 | 6.9 |
| OHV[4] | 0 | 58 | 0 | 11.0 | 21.9 | 32.9 | 43.8 |
| Extracted Uncured Monomer at 35 kGy (µg/dm$^2$) | | | | | | | |
| DPGDA | 15.1 | 1.9 | 2.1 | 2.8 | 1.1 | <0.5 | <0.5 |
| 3-MePDDA | 35.0 | 4.9 | 4.0 | 6.1 | 1.9 | <0.5 | <0.5 |
| VEEA | 34.7 | 5.9 | 3.3 | 4.5 | 2.7 | 1.6 | 1.7 |
| HBA | — | 7.5 | — | — | — | — | — |
| Extracted Uncured Monomer at 30 kGy (µg/dm$^2$) | | | | | | | |
| DPGDA | | | | | | 0.9 | |
| 3-MePDDA | | | | | | 1.5 | |
| VEEA | | | | | | 2.8 | |
| Extracted Uncured Monomer at 25 kGy (µg/dm$^2$) | | | | | | | |
| DPGDA | | | | | | 4.8 | |
| 3-MePDDA | | | | | | 10.1 | |
| VEEA | | | | | | 14.5 | |

Notes to Table 3:
[1]HBA = 4-Hydroxybutyl Acrylate; ex. Aldrich Chemicals;
[2]SR9035 = TMPEOTA having 15 moles of ethoxylation, ex. Sartomer. This monomer was shown to be a most effective alkoxylated monomer for EB-curable inkjet compositions in WO2017180496;
[3]Cyan Pigment Paste = a proprietary dispersion containing 25.0% (w/w) of Pigment 15:4, the remainder comprising the dispersant stabilizers and DPGDA (dipropyleneglycol diacrylate);
[4]OHV = Hydroxy Value Contributed by Additional Monomer (mgKOH/g (ink)).

The highly alkoxylated monomer, PEG400DA also produces a reduction in the amount of uncured monomer, after the inks were UV-cured (Comparative Examples 5 to 7).

The most effective monomer in reducing the amount of uncured monomer, as shown in Inventive Examples 1 to 3 was PEGDGE-AA, the epoxy acrylate prepared in-line with the invention. This was particularly the case for those inks where it was used at 5 and 10.0% (w/w). As well as producing the lowest amounts of uncured monomer, Inventive Examples 2 and 3 also produced prints having the lowest odor, a further indication of low residual amounts of uncured monomer. Compared with BDDGE-AA, PEGDGE- The results in Table 3 show how effective epoxy acrylates of the invention are in enhancing cure of inkjet compositions designed for EB-curing (lacking: photoinitiator). Although no photoinitiator was included in the compositions of Table 3, it should be understood that photoinitiators may be included in EB-curable ink and coating compositions comprising epoxy acrylates of the invention to facilitate a dual UV-EB curing process, as laid out in WO2017180491 and WO2017180496.

At an incorporation level of 15.0% (w/w), PEGDGE-AA, Inventive Example 6 not only produced significantly lower levels of uncured monomer than Comparative Example 8 comprising no cure boosting monomer, but also delivered lower uncured monomer levels than either 4-hydroxybutyl acrylate (Comparative Example 9) and TMPEOTA having 15 moles of ethoxylation (Comparative Example 10). These two monomers are those reported in the references as promoting the cure of EB-curable inkjet compositions.

Furthermore, Inventive Example 6 was able to produce less uncured monomer, compared with Comparative Examples 8, 9 and 10 when the EB dose was reduced from 35 kGy to 30 kGy, and less uncured monomer at 25 kGy compared with Comparative Example 8. These findings indicate that EB-curable inkjet compositions comprising epoxy acrylates of the invention would be able to achieve faster press speeds than would be achievable with the current state of the an.

The current invention has shown the surprising benefit of the inclusion of epoxy acrylates derived from the reaction poly(alkylene oxide) containing glycidyl ethers and acrylic acid, such as PEGDGE-AA demonstrated by way of the examples here. These epoxy acrylates combine the features of poly(alkylene oxide) and hydroxyl groups which both help promote the UV-, and EB-curing of inks and coatings. This is a finding not previously revealed or suggested, in the identified references.

The invention claimed is:

1. Low migration energy-curable compositions comprising:
   (a) one or more epoxy acrylates, wherein the epoxy acrylates are prepared by reacting:
      i. a poly(alkylene oxide)-containing poly glycidyl ether, wherein the average degree of alkoxylation of any poly(alkylene oxide) of the glycidyl ether is at least 2 and the number of glycidyl ether groups per molecule is at least 1; and
      ii. an acrylic acid; and
   (b) one or more ethylenically unsaturated free-radically polymerizable monomers or oligomers: wherein the one or more epoxy acrylates are present at a concentration of 2.0% (w/w) to 20.0% (w/w).

2. The composition of claim 1, wherein the poly(alkylene oxide) of the glycidyl ether is selected from either poly(ethylene oxide) or poly(propylene oxide) or poly(butylene oxide) or a blend thereof.

3. The composition of claim 1, wherein the glycidyl ether is a poly(ethylene glycol) diglycidyl ether or a poly(propylene glycol) diglycidyl ether or a poly(butylene glycol) diglycidyl ether.

4. The composition of claim 1, wherein the glycidyl ether is selected from the group consisting of ethoxylated or propoxylated glycerol glycidyl ethers, ethoxylated or propoxylated trimethylolpropane glycidyl ethers, ethoxylated or propoxylated ditrimethylolpropane glycidyl ethers, ethoxylated or propoxylated pentaerythritol glycidyl ethers, ethoxylated or propoxylated dipentaerythritol glycidyl ethers, and blends thereof, or wherein the glycidyl ether is selected from the group consisting of ethoxylated or propoxylated trimethylolpropane or pentaerythritol glycidyl ethers, or blends thereof.

5. The composition of claim 1, further comprising any blend of photoinitiators.

6. The composition of claim 5 which is UV-curable.

7. The composition of claim 6 which comprises 6.0% (w/w) or less of a photoinitiator.

8. The composition of claim 1, which is EB-curable.

9. The composition of claim 1, which is EB-curable and not UV-curable.

10. The composition of claim 9 which is essentially free of photoinitiators.

11. The composition of claim 1, which is a pigmented inkjet fluid.

12. The composition of claim 1, wherein the epoxy acrylate raises the hydroxy value of the ink by at least 5.0 mg KOH/g.

13. A process for preparing a printed substrate comprising printing the composition of claim 1 onto a substrate and curing.

14. The process of claim 13, wherein the composition is exposed to both UV and EB radiation.

15. The process of claim 13, wherein the composition is partially cured using any combination of UV-LED lamps, prior to EB-curing.

16. The process of claim 13 wherein the composition is cured by EB radiation.

17. A method of reducing the amount of uncured monomer in a cured ink or coating composition comprising applying the composition of claim 1 to a substrate and curing.

18. The use of the epoxy acrylates defined in claim 1 to promote the energy-cure of a free-radically polymerizable composition.

19. The composition of claim 1 wherein the one or more ethylenically unsaturated free-radically polymerizable monomers or oligomers, comprise one or more acrylate, methacrylate, vinyl ether, propenyl ether, N-vinyl amide, maleate, alkene or acrylamide groups.

* * * * *